(12) United States Patent
Chassin et al.

(10) Patent No.: US 8,073,573 B2
(45) Date of Patent: *Dec. 6, 2011

(54) ELECTRICAL POWER DISTRIBUTION CONTROL METHODS, ELECTRICAL ENERGY DEMAND MONITORING METHODS, AND POWER MANAGEMENT DEVICES

(75) Inventors: David P. Chassin, Pasco, WA (US); Matthew K. Donnelly, Kennewick, WA (US); Jeffery E. Dagle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/453,465

(22) Filed: Jun. 14, 2006

(65) Prior Publication Data

US 2006/0229768 A1    Oct. 12, 2006

Related U.S. Application Data

(63) Continuation of application No. 10/461,137, filed on Jun. 13, 2003, now Pat. No. 7,149,605.

(51) Int. Cl.
*G05B 11/01* (2006.01)
(52) U.S. Cl. ......... 700/286; 700/295; 700/296; 700/297
(58) Field of Classification Search .................. 700/295, 700/296, 286, 291, 297, 22, 293, 294, 298; 713/340, 601, 300, 320, 323; 705/400, 412, 705/295, 296, 286, 291; 307/11, 31, 35; 361/601, 622; 702/75
See application file for complete search history.

(56) References Cited

U.S. PATENT DOCUMENTS

| | | |
|---|---|---|
| 2,238,624 A | 4/1941 | Clark |
| 3,862,430 A | 1/1975 | Lenhart et al. |
| 4,031,406 A | 6/1977 | Leyde et al. |
| 4,090,088 A | 5/1978 | McMahon et al. |
| 4,135,101 A | 1/1979 | Young et al. |
| 4,213,058 A | 7/1980 | Townsend |
| 4,317,049 A | 2/1982 | Schweppe |
| 4,385,241 A | 5/1983 | Peddie et al. |

(Continued)

FOREIGN PATENT DOCUMENTS

CA    2082914    1/1999

(Continued)

OTHER PUBLICATIONS

"Distribution Automation;" http://www.dt2003.events.pennet.com/confrence_program.cfm; Feb. 2-4, 2003; 20 pps. "Pay-For-Performance;" http://www.honeywellcannon.com/Designs/Pay-for-Performance.asp; Mar. 19, 2004; 3 pps.
"LCR 5000"; www.honeywellcannon.com/Products/LCR5000.html; Jun. 23, 2003; 3 pps.

(Continued)

*Primary Examiner* — Charles Kasenge
(74) *Attorney, Agent, or Firm* — Wells St. John, P.S.

(57) ABSTRACT

Electrical power distribution control methods, electrical energy demand monitoring methods, and power management devices are described. In one aspect, an electrical power distribution control method includes providing electrical energy from an electrical power distribution system, applying the electrical energy to a load, providing a plurality of different values for a threshold at a plurality of moments in time and corresponding to an electrical characteristic of the electrical energy, and adjusting an amount of the electrical energy applied to the load responsive to an electrical characteristic of the electrical energy triggering one of the values of the threshold at the respective moment in time.

67 Claims, 5 Drawing Sheets

U.S. PATENT DOCUMENTS

| | | | |
|---|---|---|---|
| 4,449,178 A | 5/1984 | Blau, Jr. et al. | |
| 4,472,640 A | 9/1984 | Elmer | |
| 4,551,812 A * | 11/1985 | Gurr et al. | 700/295 |
| 4,644,320 A | 2/1987 | Carr et al. | |
| 4,835,706 A | 5/1989 | Asahi | |
| 4,868,412 A | 9/1989 | Owens | |
| 5,205,318 A | 4/1993 | Massaro et al. | |
| 5,220,807 A | 6/1993 | Bourne et al. | |
| 5,237,305 A | 8/1993 | Ishikuro et al. | |
| 5,436,510 A | 7/1995 | Gilbert | |
| 5,442,335 A | 8/1995 | Cantin et al. | |
| 5,523,631 A | 6/1996 | Fishman et al. | |
| 5,543,667 A | 8/1996 | Shavit et al. | |
| 5,544,036 A | 8/1996 | Brown, Jr. et al. | |
| 5,566,085 A | 10/1996 | Marceau et al. | |
| 5,625,236 A | 4/1997 | Lefebvre et al. | |
| 5,627,759 A | 5/1997 | Bearden et al. | |
| 5,638,297 A | 6/1997 | Mansour et al. | |
| 5,761,083 A | 6/1998 | Brown, Jr. et al. | |
| 5,762,266 A | 6/1998 | Okumura et al. | |
| 5,927,598 A | 7/1999 | Broe | |
| 5,942,026 A | 8/1999 | Erlichman et al. | |
| 5,956,462 A | 9/1999 | Langford | |
| 5,959,368 A | 9/1999 | Kubo et al. | |
| 6,046,513 A | 4/2000 | Jouper et al. | |
| 6,067,482 A | 5/2000 | Shapiro | |
| 6,157,008 A | 12/2000 | Brown et al. | |
| 6,219,623 B1 * | 4/2001 | Wills | 702/60 |
| 6,269,274 B1 | 7/2001 | Steinman et al. | |
| 6,278,909 B1 | 8/2001 | Thibeault et al. | |
| 6,314,378 B1 | 11/2001 | Hodge et al. | |
| 6,348,777 B1 | 2/2002 | Brown et al. | |
| 6,367,023 B2 | 4/2002 | Kling et al. | |
| 6,429,546 B1 * | 8/2002 | Ropp et al. | 307/31 |
| 6,476,521 B1 * | 11/2002 | Lof et al. | 307/105 |
| 6,477,063 B2 | 11/2002 | Ishii et al. | |
| 6,487,509 B1 | 11/2002 | Aisa | |
| 6,490,141 B2 * | 12/2002 | Fischer et al. | 361/66 |
| 6,493,643 B1 | 12/2002 | Aisa | |
| 6,553,418 B1 | 4/2003 | Collins et al. | |
| 6,618,649 B1 * | 9/2003 | Shilo | 700/292 |
| 6,624,532 B1 | 9/2003 | Davidow et al. | |
| 6,633,823 B2 | 10/2003 | Bartone et al. | |
| 6,671,586 B2 | 12/2003 | Davis et al. | |
| 6,772,052 B1 | 8/2004 | Amundsen et al. | |
| 6,832,135 B2 * | 12/2004 | Ying | 700/295 |
| 6,861,956 B2 | 3/2005 | Ying | |
| 6,862,498 B2 | 3/2005 | Davis et al. | |
| 7,010,363 B2 | 3/2006 | Donnelly et al. | |
| 7,036,028 B2 * | 4/2006 | Zalesski | 713/320 |
| 7,069,117 B2 * | 6/2006 | Wilson et al. | 700/295 |
| 2002/0072868 A1 | 6/2002 | Bartone et al. | |
| 2002/0192519 A1 * | 12/2002 | Fujita et al. | 320/101 |
| 2003/0050737 A1 | 3/2003 | Osann, Jr. | |
| 2003/0078797 A1 * | 4/2003 | Kanbara et al. | 700/295 |
| 2003/0233201 A1 | 12/2003 | Horst et al. | |
| 2004/0078153 A1 | 4/2004 | Bartone et al. | |
| 2004/0095237 A1 | 5/2004 | Chen et al. | |
| 2004/0117680 A1 * | 6/2004 | Naffziger | 713/322 |
| 2004/0186671 A1 | 9/2004 | Golder et al. | |
| 2004/0190211 A1 | 9/2004 | Ockert et al. | |
| 2004/0254688 A1 | 12/2004 | Chassin et al. | |
| 2005/0120492 A1 | 6/2005 | Koo et al. | |
| 2005/0154499 A1 * | 7/2005 | Aldridge et al. | 700/286 |

FOREIGN PATENT DOCUMENTS

| | | |
|---|---|---|
| CA | 2 354 242 A1 | 12/2002 |
| EP | 0 372 961 A3 | 6/1990 |
| EP | 0 597 322 A3 | 5/1994 |
| EP | 1 372 238 A1 | 12/2003 |
| GB | 2080640 A | 2/1982 |
| GB | 2361118 A | 10/2001 |
| GB | 2361118 B | 5/2002 |
| JP | 03-503833 | 8/1991 |
| JP | 1997074674 A | 3/1997 |
| JP | 1998009640 A | 1/1998 |
| JP | 57-049332 | 3/2002 |
| JP | 2003-149272 | 5/2003 |
| WO | WO89/08342 | 9/1989 |
| WO | WO 8908342 A1 * | 9/1989 |
| WO | WO99/52194 | 10/1999 |
| WO | WO 01/01542 A1 | 1/2001 |
| WO | WO02/07365 A2 | 1/2002 |
| WO | WO 02/069471 A1 | 9/2002 |
| WO | WO03/001645 A2 | 1/2003 |
| WO | WO03/008983 A2 | 1/2003 |

OTHER PUBLICATIONS

"The Yukon System"; www.honeywellcannon.com/prducts/Yukon. html; Jun. 23, 2003; 7 pps.

"ExpressStat Programmable Demand Response Thermostat;" www.honeywellcannon.com/Products/ExpressStat.html; Jun. 23, 2003; 2 pp.

"Fast load shedding for angle stability control;" Rovnyak S.M.; Kejun Mei; Guang Li; Power Engineering Society General Meeting, 2003, IEEE, vol. 4, Jul. 13-17, 2003; pp. 2275-2279.

"The status of demand response in New York;" Lawrence, D.J.; Neenan, B.F.; Power Engineering Society General Meeting, 2003, IEEE , vol. 4 , Jul. 13-17, 2003; pp. 2270-2274.

"Load response and system reliability situations;" Burke, R.B.; Henderson, M.I.; Platts, J.E.; Power Engineering Society General Meeting, 2003, IEEE , vol. 4 , Jul. 13-17, 2003; pp. 2285-2288.

"Demand side response 21st century style;" Covina, S.; Power Engineering Society General Meeting, 2003, IEEE ,vol. 4 , Jul. 2003, pp. 2280-2284.

"Considerations for load as a virtual generator for grid security;" Kehler, J.H.;Power Engineering Society General Meeting, 2003, IEEE,vol. 4 , Jul. 2003; pp. 2289-2292.

"News & Events—Papers & Panels;" http://www.cannontech.com/news/papers.asp; Mar. 19, 2004; 3 pps.

"Statistical Mechanics: A Possible Model for Market-based Electric Power Control;" D.P. Chasin; Pacific Northwest National Laboratory; Jan. 2004; pp. 1-10.

"Power Market Dynamics: The Statistical Mechanics of Transaction-Based Control;" D.P. Chasin; Pacific Northwest National Laboratory; Jun. 30-Jul. 2, 2003; pp. 573-582.

"Mass Market Pay-for-Performance Incentive Plane;" Cannon Technologies; Mar. 19, 2004; pp. 1-10.

"Smart Load Control and Grid-Friendly Appliances"; Kintner-Meyer; Program Advisory Committee (PAC) of the project and CEC staff on Oct. 23, 2001; 7 pps.

"Demand Response—Direct Control;" http://www.cannontech.com/products/drdirectcontrol.asp; Mar. 19, 2004; 3 pps.

"SuperStat™"; www.comverge-tech.com/sustat.html; 2002; 1 pp.

"Mass Market Pay-for-Performance Demand Response—Price-Based DR Programs with No Interval Metering Required;" Backer, Doug; EnergyPulse.net; Feb. 18, 2003; 3 pps.

"Demand Response—Direct Control"; www.cannontech.com/products/drdiretcontrol.asp; Nov. 19, 2003; 3 pps.

"What is TWACS"; www.twacs.com; Jun. 23, 2003; 2 pps.

PCT/US2004/018333; Oct. 28, 2004; International Seatch Report/Written Opinion; 16pp.

"End-Use Load Control for Power System Dynamic Stability Enhancement;" Dagle et al.; U.S. Dept. Of Energy under Contract DE-AC06-76RLO 1830; Pacific Northwest National Laboratory; Feb. 1997; 50 pps.

"Passive vs. Active Demand Response in Today's Marketplace;" Douglas Backer; Cannon Technologies, Inc.; Feb. 4, 2003; 7 pps.

PCT/US2004/018333; mailed Dec. 29, 2005; International Preliminary Report on Patentability, Chapter 1, 12 pp.

"What is Energy Star?"; www.energystar.gov/index.cfm?c=about.ab_index.html; Apr. 16, 2003; 2 pps.

U.S. Appl. No. 60/485,435, filed Feb. 26, 2003, Cannon et al.

U.S. Appl. No. 60/450,417, filed Jul. 8, 2003, Ockert et al.

U.S. Appl. No. 60/496,532, filed Aug. 20, 2003, Wallace et al.

* cited by examiner

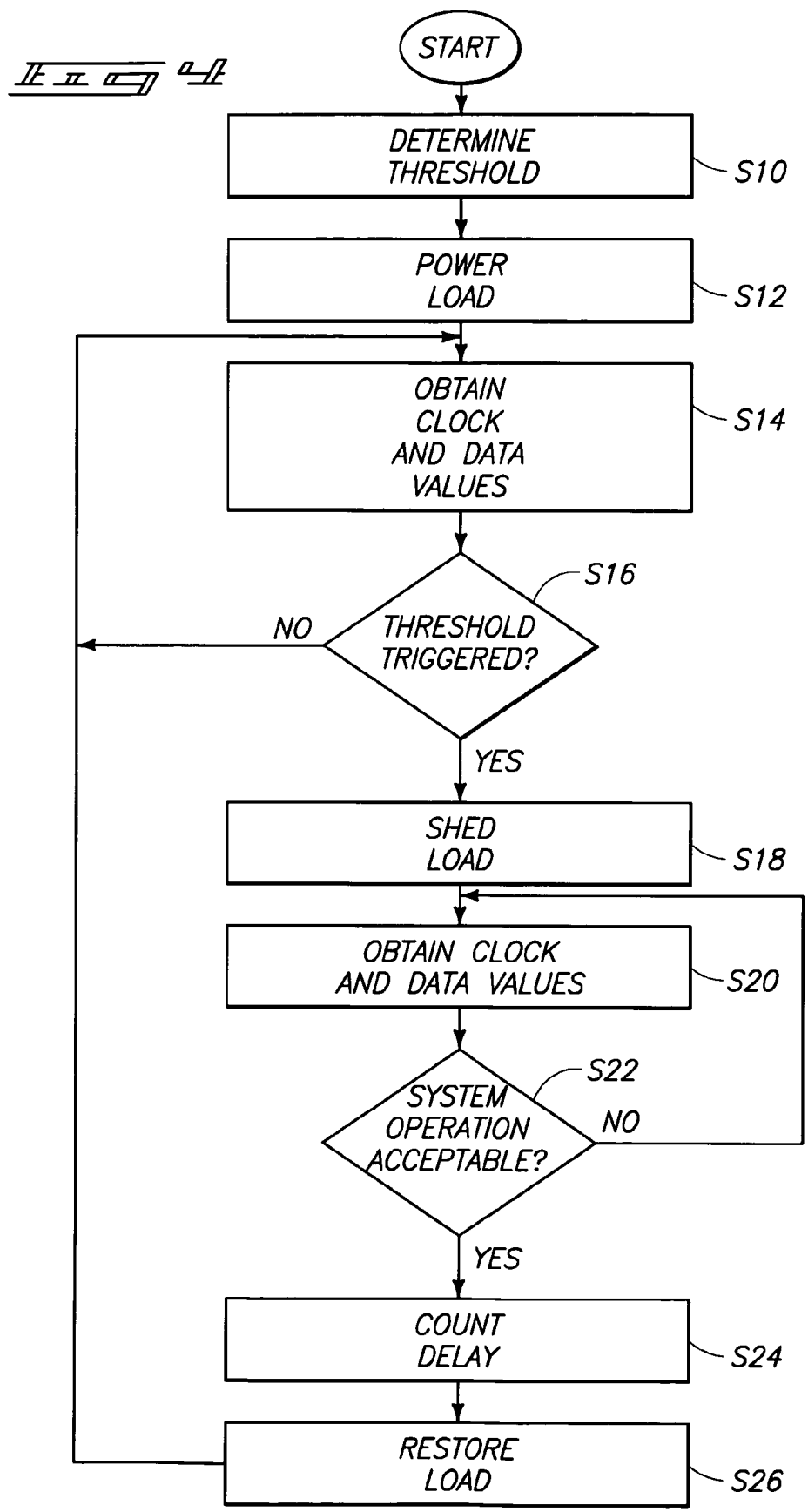

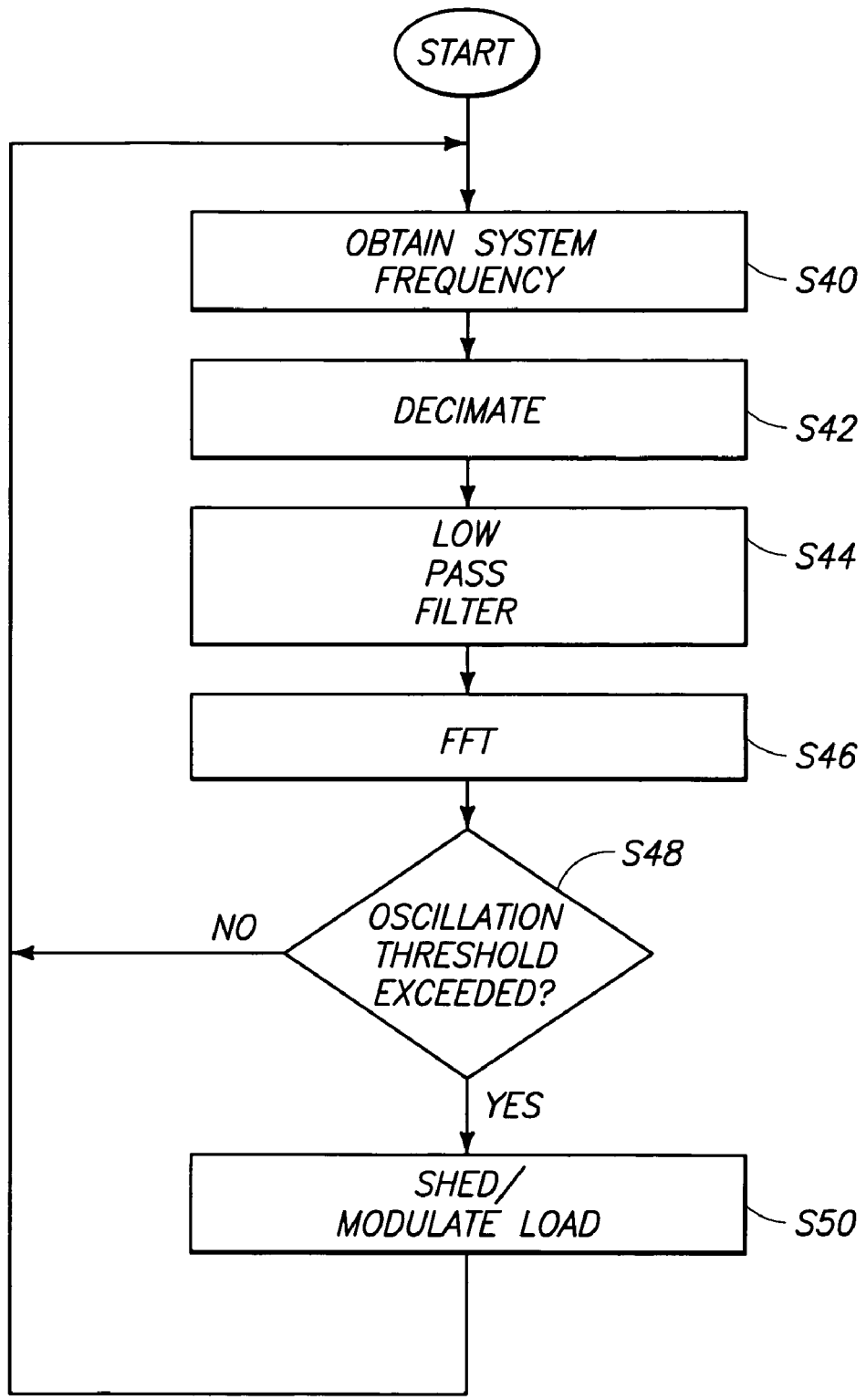

ELECTRICAL POWER DISTRIBUTION CONTROL METHODS, ELECTRICAL ENERGY DEMAND MONITORING METHODS, AND POWER MANAGEMENT DEVICES

RELATED PATENT DATA

The present application is a continuation of and claims priority to U.S. patent application Ser. No. 10/461,137 filed on Jun. 13, 2003 now U.S. Pat. No. 7,149,605, entitled "Electrical Power Distribution Control Methods, Electrical Energy Demand Monitoring Methods, and Power Management Devices", naming David P. Chassin, Matthew K. Donnelly, and Jeffrey E. Dagle, as inventors, the disclosure of which is incorporated herein by reference.

TECHNICAL FIELD

This invention relates to electrical power distribution control methods, electrical energy demand monitoring methods, and power management devices.

BACKGROUND OF THE INVENTION

Consumption of and reliance upon electrical energy is increasing. Usage of electrical energy is ubiquitous in almost every aspect of life. Businesses, entertainment, communications, etc. Are heavily dependent upon electrical energy for fundamental operation. Power distribution systems or grids provide electrical energy to households, businesses, manufacturing facilities, hospitals, etc. Such systems are typically reliable, however, numerous systems employ backup electrical supplies in case of failure of the power distribution system being utilized.

Some electrical power distribution systems are ever-changing dynamic systems and operations are often concerned with balancing generation with load. Frequency of the voltage of the electrical energy may be used as an indicator of variances between generation of electrical energy and usage of electrical energy by loads coupled with the electrical power distribution system. For example, when demand exceeds generation, the frequency of the electrical energy on the electrical power distribution system may drop, and conversely, when there is excess electrical energy available, the frequency increases. Over a given 24 hour period, it is desired to balance energy surplus and deficit so the average frequency is 60 Hz, or other desired frequency.

Typically, control of the state of the electrical power distribution system is implemented by controlling operations of generators coupled with the system. For example, at times of increased demand, the output of generators may be increased and/or other generators may be brought on-line to assist with supplying the electrical energy. In addition, spinning reserves may be utilized to accommodate unexpected significant fluctuations in demand for electrical energy. Provision of spinning reserves is costly, and much of the time, not used.

Some electrical power distribution approaches have been designed to curtail peak loads through the utilization of Demand Side Management (DSM). DSM techniques include direct load control wherein a utility has the ability to curtail specific loads as conditions warrant. In these arrangements, a utility may broadcast a control signal to specific loads when curtailment is desired (e.g., during peak usage periods).

Other electrical power distribution approaches attempt to stabilize bulk-power transmission corridors using external Flexible AC Transmission System (FACTS) devices to improve dynamic performance of transmission systems. FACTS devices, such as Static-Var Compensation (SVC) and Thyristor-Controlled Series Capacitors (TSCSs), are designed to provide stability enhancements allowing transmission facilities to be loaded to levels approaching their ultimate thermal capacity. These devices may supply reactive power to support voltage or provide modulation to damp electromechanical oscillations.

Utilities may use other devices at distribution points (e.g., substations and/or switchyards) to manage electrical power distribution operations. Exemplary management devices include underfrequency and undervoltage relays. These devices may "black out" entire neighborhoods when a grid is in trouble allowing the grid to recover before power is reapplied to the blacked out customers.

Oscillations of power flows within electrical distribution systems are of concern to utilities. Some techniques utilize large power flow controllers within high capacity transmission lines to reduce or minimize oscillations of power flows. These devices are typically relatively expensive and require significant investment by a utility.

Aspects of the present invention provide improved apparatus and methods for supplying electrical energy.

BRIEF DESCRIPTION OF THE DRAWINGS

Preferred embodiments of the invention are described below with reference to the following accompanying drawings.

FIG. 4 is a flow chart illustrating an exemplary control methodology for applying electrical energy to a load according to one embodiment.

FIG. 5 is a flow chart illustrating another exemplary control methodology for applying electrical energy to a load according to one embodiment.

DETAILED DESCRIPTION OF THE PREFERRED EMBODIMENTS

Figure 1:
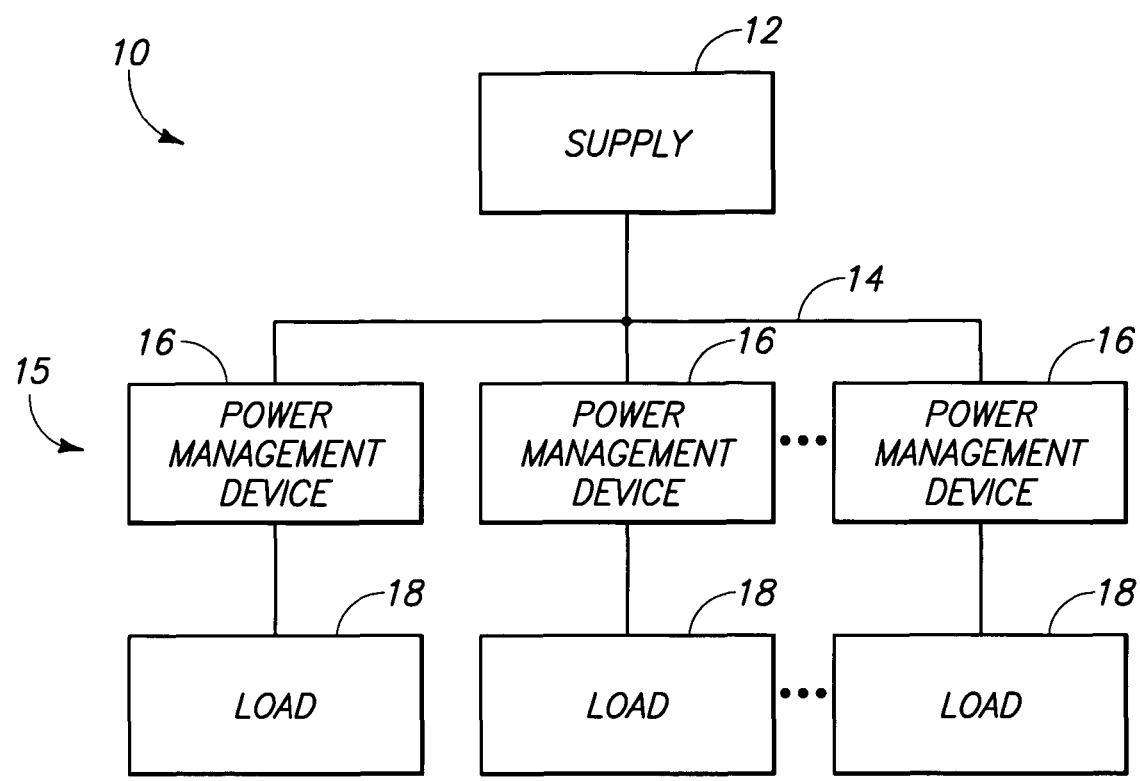
FIG. 1 is a functional block diagram of an exemplary electrical power distribution system according to one embodiment.

According to one aspect of the invention, an electrical power distribution control method comprises providing electrical energy from an electrical power distribution system, applying the electrical energy to a load, providing a plurality of different values for a threshold at a plurality of moments in time and corresponding to an electrical characteristic of the electrical energy, and adjusting an amount of the electrical energy applied to the load responsive to an electrical characteristic of the electrical energy triggering one of the values of the threshold at the respective moment in time.

According to another aspect of the invention, an electrical power distribution control method comprises providing electrical energy from an electrical power distribution system, applying the electrical energy to a load, randomly selecting a value of a threshold corresponding to an electrical characteristic of the electrical energy of the electrical power distribution system, and adjusting an amount of the electrical energy applied to the load responsive to the electrical characteristic of the electrical energy triggering the value of the threshold.

According to another aspect of the invention, an electrical power distribution control method comprises receiving electrical energy from an electrical power distribution system using control circuitry, applying electrical energy of the electrical power distribution system to a load using the control circuitry, monitoring an electrical characteristic of the received electrical energy using the control circuitry, and adjusting the applying at a plurality of moments in time responsive to the monitoring, wherein the adjusting comprises adjusting for a plurality of different lengths of time at the respective moments in time.

According to yet another aspect of the invention, an electrical power distribution control method comprises providing electrical energy from an electrical power distribution system, applying the electrical energy to a plurality of loads coupled with the electrical power distribution system, providing a power management system comprising a plurality of power management devices coupled with respective ones of the loads, and controlling an electrical characteristic of the electrical energy of the electrical power distribution system using the power management system.

According to an additional aspect of the invention, an electrical energy demand monitoring method comprises providing electrical energy from an electrical power distribution system, applying the electrical energy to a plurality of loads coupled with the electrical power distribution system, monitoring an electrical characteristic of the electrical energy, adjusting an amount of the electrical energy applied to at least one of the loads responsive to the monitoring, and calculating a deficit of the electrical energy of the electrical power distribution system responsive to the monitoring.

According to another aspect of the invention, an electrical power distribution control method comprises providing electrical energy using an electrical power distribution system, applying the electrical energy to a load using a power management device, detecting a power oscillation within the electrical power distribution system, and adjusting an amount of electrical energy applied to the load using the power management device and responsive to the detecting.

According to yet another aspect of the invention, a power management device comprises an interface configured to receive electrical energy from an electrical power distribution system and control circuitry configured to control an amount of the electrical energy provided to a load coupled with the power management device, to access a plurality of different values for a threshold at a plurality of moments in time and corresponding to an electrical characteristic of the electrical energy, to monitor the electrical characteristic of the electrical energy with respect to the threshold, and to adjust the amount of the electrical energy provided to the load responsive to the electrical characteristic of the electrical energy triggering a respective one of the values of the threshold.

According to still another aspect of the invention, a power management device comprises an interface configured to receive electrical energy from an electrical power distribution system and control circuitry configured to control an amount of the electrical energy provided to a load coupled with the power management device, to detect a power oscillation within the electrical power distribution system, and to adjust an amount of the electrical energy provided to the load responsive to the detection of the power oscillation.

Referring to FIG. 1, an electrical power distribution system 10 is shown arranged according to one exemplary illustrative embodiment. System 10 comprises any appropriate electrical energy delivery system configured to deliver residential, commercial, industrial, or other electrical energy from a supply to customers or consumers. The depicted exemplary system 10 comprises an electrical energy supply 12, a distribution grid 14, and an exemplary power management system 15 comprising a plurality of power management devices 16. A plurality of loads 18 are depicted coupled with the electrical power distribution system 10 and are configured to consume electrical energy provided from supply 12. System 10 may comprise loads 18 in some embodiments (e.g., configurations wherein power management operations are implemented entirely or partially by the load itself).

Supply 12 is configured to provide electrical energy for consumption by loads 18. Supply 12 may be arranged as one or more generator or other construction configured to supply electrical energy. Generators may be individually taken on-line or off-line, or the output thereof may be adjusted, according to the usage of the electrical energy. In one exemplary implementation, supply 12 is arranged to provide alternating current electrical energy at a system frequency of 60 Hz. System frequency is the frequency of system voltage.

Distribution grid 14 operates to conduct the electrical energy from the supply 12 to appropriate destinations for consumption. In one embodiment, distribution grid 14 may comprise a plurality of different voltage distribution lines and transformers configured to conduct the electrical energy over substantial distances between distant geographical locations. Distribution grid 14 may provide electrical energy at exemplary voltages of 120/240 VAC (residential), 120/208 VAC (commercial), 277/480 VAC (industrial) or other appropriate voltages for usage by customer loads 18 in one example.

Power management devices 16 are configured to selectively apply electrical energy from supply 12 to respective loads 18 as described below. In the exemplary depicted implementation, all of the illustrated loads 18 have associated power management devices 16. In other configurations, only some of the loads 18 may have associated power management devices 16.

Power management devices 16 are configured to monitor at least one characteristic of the electrical energy provided from supply 12. In one embodiment, power management devices 16 are configured to monitor system frequency of the electrical energy and to adjust the amount of electrical energy supplied to the respective load 18 responsive to the monitoring. For example, in one operational implementation, power management devices 16 may reduce an amount of electrical energy supplied to respective loads 18 responsive to detection of a drop in system frequency of the electrical energy provided by supply 12.

In the exemplary embodiment, power management devices 16 are illustrated separate from loads 18. In other possible embodiments, power management devices 16 may be proximately located to the respective loads 18, physically positioned adjacent to the respective loads 18, embedded within the loads 18 (e.g., providing the power management devices 16 within housings of the loads 18), etc. It is also possible to implement power management operations described herein (or other operations of control circuitry described below) using control circuitry of the load itself and configured to control operations with respect to the load. These implementations are exemplary and other implementations or operations are possible.

Loads 18 may have any configuration which consumes supplied electrical energy. Loads 18 may also be referred to as appliances, motors, or utilization equipment. In addition, one or more of loads 18 may comprise a plurality of different internal loads. Consumption of electrical energy by such loads 18 may be adjusted by turning off one internal load while leaving another internal load powered. For example, for a given appliance, there may be a control load wherein processing is implemented (e.g., 3-5 Volt circuitry) and higher voltage loads including exemplary motors, heating coils, etc. During exemplary power management operations, it may be desired adjust an amount of electrical energy applied to one of the internal loads while continuing to provide a full amount of electrical energy to an other of the internal loads. Alternately, power may be reduced to all internal loads or ceased all together. Other methods may be utilized to adjust an amount of electrical energy consumed within a given load 18.

In one embodiment, depicted loads 18 correspond to loads at one or more customer location. Loads 18 may be configured to consume electrical energy received via any suitable electrical connector (e.g., wall outlet) from supply 12. In one embodiment, monitoring of electrical energy of system 10 and/or control of operational modes of loads 18 may be implemented by control circuitry (e.g., control circuitry 24 of devices 16 described below) at the customer location (e.g., proximate to the loads 18). Additional details of exemplary power management operations and exemplary control circuitry to implement power management operations are described in co-pending U.S. patent application entitled "Electrical Appliance Energy Consumption Control Methods And Electrical Energy Consumption Systems", having application Ser. No. 11/301,868, listing Jeff Dagle, Michael Kinter-Meyer, David W. Winiarski, David P. Chassin, Robert G. Pratt, Anne Marie Borbely Bartis, and Matt Donnelly as inventors, the teachings of which are incorporated herein by reference.

Figure 2:
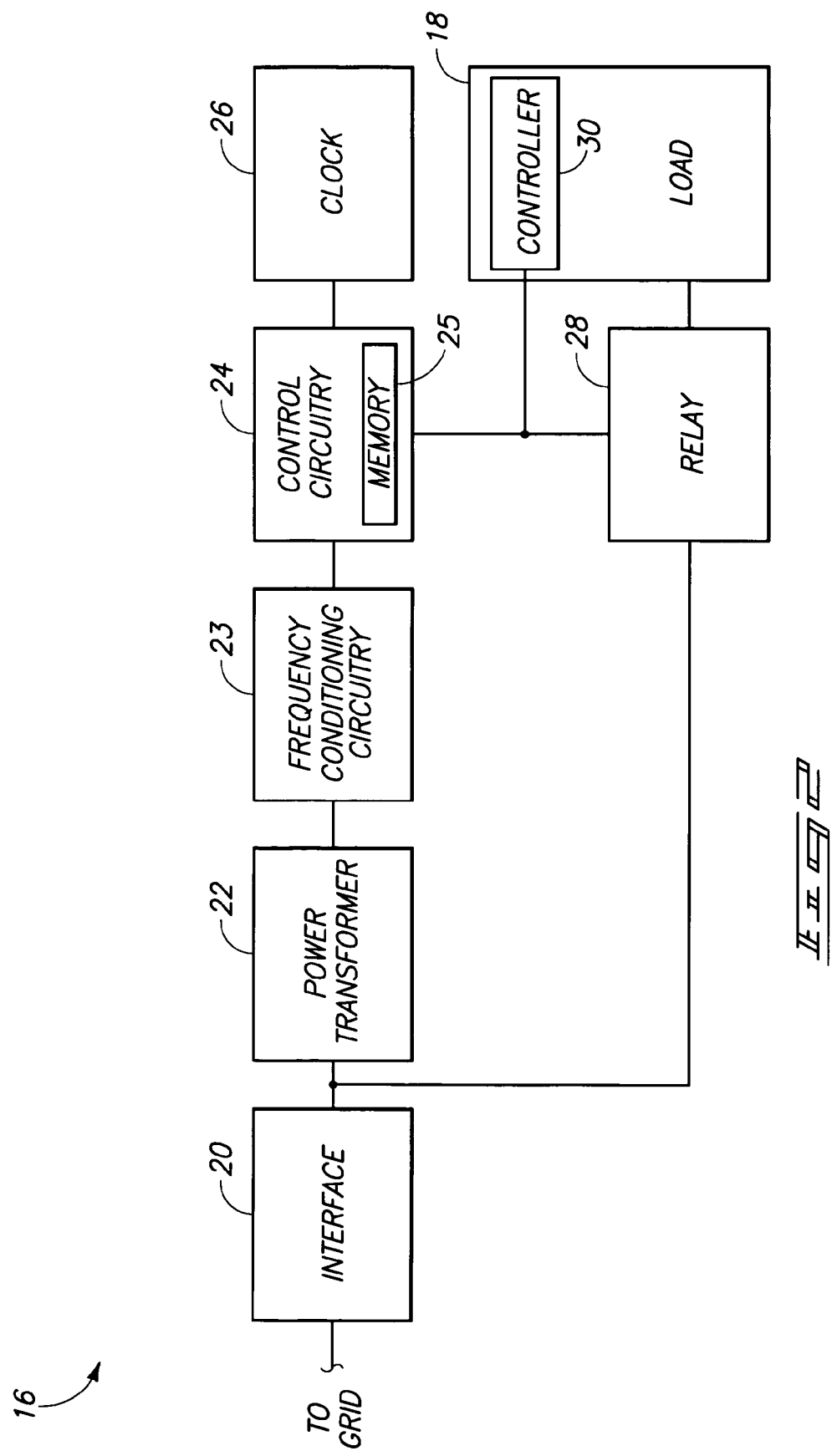
FIG. 2 is a functional block diagram of an exemplary power management device according to one embodiment.

Referring to FIG. 2, an exemplary arrangement of a power management device 16 configured to adjust an amount of electrical energy supplied to a load is shown. The illustrated power management device 16 comprises an interface 20, a power transformer 22, frequency conditioning circuitry 23, control circuitry 24, a clock 26, and a relay 28.

Interface 20 is configured to couple with grid 14 of the power distribution system 10 and to receive electrical energy. Interface 20 may be sized and configured corresponding to the power requirements of the respective load 18.

Power transformer 22 is coupled with interface 20 and is arranged to transform the electrical energy for processing within power management device 16. In one exemplary implementation, power transformer is configured to reduce a voltage of electrical energy received from grid 14 and to output electrical energy having a voltage of approximately 30 VAC.

Frequency conditioning circuitry 23 in one possible implementation is initially configured to convert received sinusoidal alternating current electrical energy into a square waveform indicative of zero-crossings of the sinusoidal waveform. For example, frequency conditioning circuitry 23 may comprise a voltage divider for providing a 8 VAC sinusoidal wave to a high speed amplifier of the conditioning circuitry 23 and configured to provide a +/−5 VAC square wave. The frequency conditioning circuitry 23 may additionally comprise a voltage clipping circuit configured to receive the +/−5 VAC square waveform and provide a pulse wave where a rising edge represents a positive zero-crossing event of the electrical energy from grid 14 and a falling edge represent a negative zero-crossing event of the electrical energy from grid 14 (although not shown, the voltage divider, the high speed amplifier and the voltage clipping circuit of an exemplary frequency conditioning circuitry 23 may be arranged in series). Accordingly, the edges of the pulse wave correspond to respective zero-crossings of the AC waveform. Frequency conditioning circuitry 23 may comprise additional conditioning circuits (not shown) in the voltage divider, amplifier and/or clipping circuit to filter small voltage fluctuations corresponding to noise. Other arrangements of frequency conditioning circuitry 23 are possible.

Control circuitry 24 is configured to monitor received electrical energy and to control operations of power management device 16 and/or load 18 to maintain operation of the power distribution system 10 within a desired range. In one embodiment, the control circuitry 24 may comprise circuitry configured to implement desired programming. For example, the control circuitry 24 may be implemented as a processor or other structure configured to execute executable instructions including, for example, software and/or firmware instructions. In one arrangement, appropriate programming may be stored within memory 25 of control circuitry 24. Other exemplary embodiments of control circuitry 24 include hardware logic, PGA, FPGA, ASIC, or other structures. These examples of control circuitry 24 are for illustration and other configurations are possible.

In but one configuration, power management system 15 and power management devices 16 are configured to implement power management operations of power distribution system 10. Control circuitry 24 of devices 16 are configured to monitor electrical energy of system 10 and to implement and/or control power management operations responsive to the monitoring in one example. Exemplary power management operations include adjusting an amount of electrical energy supplied to respective loads 18 using the power management devices 16.

For example, control circuitry 24 may issue a control signal to a controller 30 of the respective load 18 to implement power management operations. The control signal may instruct load 18 to enter a mode of operation wherein less electrical energy is consumed.

Alternatively, or in addition to application of a control signal to controller 30, control circuitry 24 may control relay 28 to adjust an amount of electrical energy applied to load 18. For example, control circuitry 28 may control relay 28 to cease or reduce the amount of electrical energy passed thereby to load 18. Additional details regarding exemplary monitoring and control of control circuitry 24 are described below. Furthermore, other power management operations may be utilized by power management device 16 responsive to monitoring of the electrical energy of the power distribution system 10.

It is desired to minimize deviation of the system frequency of electrical energy of the power distribution system 10 from a desired nominal value (e.g., 60 Hz). Various correction actions may be undertaken to minimize such deviations. In one arrangement, an output of generators of supply 12 may be adjusted or additional generators may be brought on-line or off-line within supply 12 in an effort correct system frequency deviation conditions.

In accordance with aspects of the invention, power management devices 16 may undertake the power management operations in an effort to balance electrical energy generation and consumption and to maintain a system frequency of the electrical energy within a desired range. For example, in one arrangement, control circuitry 24 monitors at least one electrical characteristic of electrical energy provided by grid 14 (e.g., system frequency in the described example) and adjusts an amount of electrical energy consumed by load 18 responsive to the monitoring.

Exemplary monitoring of the system frequency may be implemented using clock 26 in the illustrated arrangement. For example, clock 26 provides a reference clock signal, such as a 7.2 MHz signal, to control circuitry 24. Control circuitry 24 is configured to count a number of pulses of the clock signal corresponding to pulses of the received pulse waveform from frequency conditioning circuitry 23. For example, control circuitry 24 may count the number of pulses of the clock signal between rising edges of the pulse waveform. The counted number of pulses corresponds to the system frequency of the received electrical energy.

Control circuitry 24 is further configured to access a value of a shed threshold for comparison operations which may trigger power management operations. Control circuitry 24 compares the counted number of clock pulses with respect to the value of the shed threshold to compare the system frequency of the received electrical energy with respect to the value of the shed threshold. As described below, the monitoring may trigger control power management operations of the power management device 16, including, for example, adjusting or ceasing a supply of electrical energy from the grid 14 to the respective load 18.

In some arrangements, numerous power management devices 16 configured to implement power management operations may be and typically are simultaneously coupled with a given grid 14. Severe stresses may be introduced if all or a substantial number of devices 16 were configured to simultaneously implement power adjustment operations.

In one accordance with one aspect, power management devices 16 are configured to implement power management operations at different moments in time to distribute the effects of such adjustment of the devices 16 over a longer period of time to avoid or minimize stresses to supply 12 and grid 14 as a result of the power adjustment operations. In one embodiment, the power management devices 16 are configured to implement power adjustment operations responsive to different criteria. In one embodiment, devices 16 may be configured with different values of the shed threshold to control the triggering of power management operations. Utilization of different values of the shed threshold causes the devices 16 to trigger responsive to different values of system frequency of the electrical energy in the described example to spread the effects of the power management operations.

In accordance with an exemplary embodiment, if the system frequency of the electrical energy reaches a first value (e.g., 59.95 Hz), all devices 16 configured with the first value implement power management operations. Thereafter, if the system frequency continues to drop to a second value (e.g., 59.93 Hz) all devices configured with the second value implement power management operations. This exemplary methodology may utilize additional different values of the shed threshold for additional devices 16 to spread the effects or inconvenience of the power management operations over a longer period of time.

In accordance with above described example, devices 16 configured to trigger at a value closest to the nominal system frequency will trigger power management operations first. Some power management operations (e.g., reducing or ceasing the application of electrical energy) may adversely impact the operation of the associated loads 18.

According to additional exemplary aspects, it is desired to configure individual power management devices 16 to utilize a plurality of different values for the shed threshold at different moments in time for comparison operations to avoid or minimize one or more of devices 16 being more frequently susceptible to power management operations than others of the devices 16. Accordingly, the utilization of different values of the respective shed thresholds by devices 16 provides an equitable distribution of power management inconvenience to the associated users in one implementation.

In one embodiment, power management devices 16 are individually configured to vary the values of the shed threshold at different moments in time to provide a plurality of different values for the shed threshold. In exemplary aspects described below, power management devices 16 randomly assign the respective value at different moments in time. The random assignment by individual devices 16 provides values for the shed threshold between an upper bounding value and a lower bounding value which control the respective frequencies at which power management operations are implemented responsive to the system frequency. It may be desired to set the upper bounding value to a point below a critical frequency or value to avoid devices triggering too frequently responsive to normal operational fluctuations of the system frequency of the power distribution system 10. Using the western grid of North America as one example, an upper bounding value corresponding to the critical value may be 59.95 Hz. The critical value may vary from system to system and also at different times of the year.

Setting the lower bounding value establishes a desired range or distribution of the triggering of the power management devices 16 from the upper bounding value inasmuch as all power management devices 16 are triggered if the system frequency drops to the lower bounding value. In one implementation, the lower bounding value is selected to provide a distribution range of at least 0.01 Hz, and perhaps 0.05 Hz, between the upper bounding value and the lower bounding value. Other ranges may be provided in other embodiments.

A statistical distribution may be utilized to assign values for the shed thresholds of the respective devices 16 between the upper and lower bounding values. One implementation of randomization includes assigning the values of the respective shed thresholds upon power-up of the power management devices 16 to provide a uniform distribution of shed threshold values amongst the present power management devices 16. Power-up may include provision of operational energy to control circuitry 24 of device 16.

As mentioned previously, control circuitry 24 of a device 16 may comprise memory 25 and memory 25 may be utilized to randomly assign the respective value for the shed threshold upon power-up of the device 16. For example, memory 25 may comprise programmable gate array (PGA) memory or static random access memory (SRAM). Upon power-up, such configurations of memory initialize with a random number resulting from electrical noise. Accordingly, a portion of memory 25 may be used to set the value for the shed threshold upon power-up. Control circuitry 24 may thereafter access the randomly generated number from memory and use the accessed number as an offset (and accordingly setting the shed threshold) for comparison purposes with respect to counted values from clock 26 during system frequency monitoring operations. In one example, the randomly generated number for a given device 16 may be subtracted from the upper bounding value to define the respective shed threshold for the device 16. The randomly generated offset is chosen such that the trigger value does not exceed the lower bounding value. One arrangement provides a 0.001 Hz offset of shed threshold per bit value. Accordingly, if a range between upper and lower bounding values of 0.05 Hz is desired, 50 different possible bit values are utilized. Other methods are possible for implementing the varying of the values of the shed threshold.

Values of the shed threshold may be updated or changed at intervals or responsive to conditions different than power-up operations. For example, in one possible embodiment, control circuitry 24 may reinitialize memory 25 at desired moments in time to reset the randomly generated values. Reinitialization responsive to actions of control circuitry 24 or other structure may be desired in situations wherein a device 16 may undergo significant periods of time wherein no new power-up operation is performed (e.g., device 16 is powered for long periods of time). In other embodiments, the shed threshold is fixed for devices 16.

Following implementation of power management operations responsive to the shed threshold being triggered, control circuitry 24 continues to monitor the electrical energy of the system 10 to determine an appropriate time to return to normal (e.g., increased consumption) operation. In one embodiment, a restore threshold may be used to control resumption of normal power consumption operations with respect to load 18. According to one arrangement, the value for the shed threshold may be used as a value of the restore threshold to determine when to resume normal operations (e.g., responsive to the system frequency rising above the value of the shed threshold). In another embodiment, a hysteresis value may be used to define the value of the restore threshold.

Figure 3:
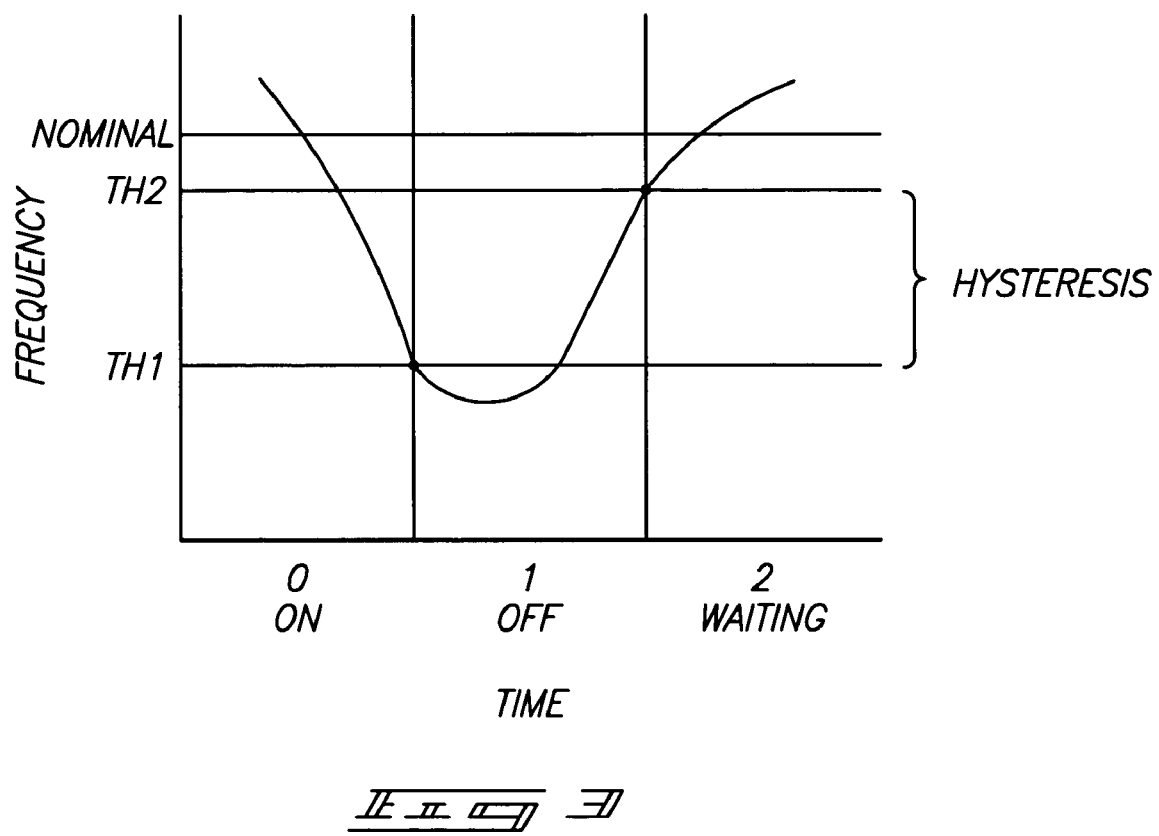
FIG. 3 is an illustrative representation of a plurality of exemplary operational states of the power management device according to one embodiment.

Referring to FIG. 3, exemplary states of the power management devices 16 are shown with respect to system frequency and an exemplary shed threshold and restore threshold. The shed threshold is depicted as TH1 and the restore threshold is depicted as TH2. The nominal system frequency may be 60 Hz. The hysteresis value may be defined as the difference between TH1 and TH2. The hysteresis is utilized in one aspect to minimize resumption operations in continued conditions of grid instability.

In state 0, the power management device 16 is in normal power consumption mode wherein device 16 provides desired electrical energy to the respective load 18. Following detection of system frequency triggering TH1 (e.g., dropping below TH1), the device 16 enters state 1 wherein electrical energy either is not applied to load 18 or a reduced amount of electrical energy is applied. During state 1, control circuitry 24 monitors the system frequency with respect to the restore threshold. Once the system frequency rises above the restore threshold, the condition of the power distribution system 10 is recovering and device 16 enters state 3.

In state 3, a delay timer may be triggered to establish a delay period for returning the respective device 16 to a normal operational mode. In one embodiment, the length of the delay is different for different devices 16. It is desirable in one aspect to have devices perform restoration or resumption operations at different times to minimize significant simultaneous load fluctuations responsive to numerous devices 16 restoring consumption at the same moment in time. Accordingly, different devices 16 have different periods of delay which are triggered responsive to system frequency triggering the restore threshold TH2. The delay periods are counted by the respective devices 16 responsive to triggering of TH2 and thereafter the respective loads 18 may be restored after the respective delay periods.

In one embodiment, the amount of delay for a given individual device 16 changes at different moments in time. For example, the period of delay may be randomly generated at different moments in time. The delay may be calculated using the value from memory 25 described above in one instance. As described in the previous example, the random number may be generated from 50 or more different possible random numbers by memory 25. Control circuitry 24 may utilize the randomly generated number to provide a length of delay in seconds corresponding to the magnitude of the randomly generated number. Following detection of system frequency rising above TH2, control circuitry 24 may count the respective delay period during state 3 (e.g., in waiting mode), and thereafter return to state 0 including load restoration and monitoring of system frequency with respect to TH1. Other methods are possible for varying values for the shed threshold and/or the period of delay before load restoration. For example, varying may be implemented by a rotating number of values or other mechanism not comprising random generation.

Additional exemplary operational aspects provide time-out operations. For example, it is possible that the system frequency may remain below the shed threshold for a lengthy period of time. It may not be acceptable to shed the associated load for excessive periods of time. In one embodiment, control circuitry 24 is arranged to monitor a length of time while in state 1 with respect to a time-out period. If the length of time exceeds the time-out period, control circuitry 24 may enter state 2 to initiate the restore load operations following the delay period, or alternatively, proceed to directly immediately restore the load 18. In other embodiments, a user may input a command via an interface or other appropriate device (not shown) to instruct the control circuitry 24 to bypass the load shed operations.

Referring to FIG. 4, an exemplary methodology performed by control circuitry 24 illustrating exemplary monitoring of the electrical energy and performing power management operations is shown. Other methods are possible including more, less, or alternative steps.

At a step S10, the control circuitry is configured to determine the shed threshold. In one configuration, the shed threshold is calculated using a randomly generated value from memory.

At a step S12, the control circuitry is configured to provide the power management device within a normal mode of operation wherein a desired amount of electrical energy is applied to the associated load to provide appropriate operation of the load.

At a step S14, the control circuitry implements monitoring operations of the electrical energy of the power distribution system including obtaining clock values from the associated clock and data values from the frequency conditioning circuitry (e.g., pulse wave described previously) to determine an electrical characteristic of electrical energy of the power distribution system (e.g., the control circuitry may calculate system value).

At a step S16, the control circuitry compares the calculated system frequency with respect to the shed threshold to determine if power management operations are desired (e.g., responsive to system frequency dropping below an upper bounding value).

If the condition of step S16 is negative, the control circuitry returns to step S14 to continue to monitor the electrical characteristic.

If the condition of step S16 is affirmative, the control circuitry proceeds to step S18 to implement exemplary power management operations. In the described example, the control circuitry adjusts an amount of power consumption of an associated load. The control circuitry may implement a shed load operation wherein an amount of electrical energy consumed by a load is reduced or ceased. Step S18 corresponds to the power management device entering a state 1 mode of operation from state 0.

At a step S20, the control circuitry obtains updated clock and data values to continue to monitor the electrical characteristic of the electrical energy of the power distribution system.

At a step S22, the control circuitry determines whether the operation of the power distribution system has returned to an acceptable level. Step S22 may comprise the control circuitry comparing the system frequency with respect to the restore threshold.

If the condition of step S22 is negative, the control circuitry returns to step S20 to obtain updated data for continued monitoring operations.

If the condition of step S24 is affirmative, the control circuitry proceeds to a step S24 to count the desired delay period. The delay period may be randomly calculated, otherwise varied, or fixed. Proceeding from step S22 to step S24 corresponds to the state of the power management device changing from state 2 to state 3.

Following counting of the delay period, the control circuitry operates to restore the load at a step S26 wherein the amount of electrical energy applied to the respective load may be increased.

As described above with respect to FIG. 1, power management system 15 may be implemented using a plurality of power management devices 16 in the illustrated exemplary configuration. Power management system 15 may be considered as system for managing operations of power distribution system 10 by controlling an amount of electrical energy consumed using attached loads 18. Operations of power management system 15 may be utilized to control an electrical characteristic of electrical energy of electrical power distribution system 10 if implemented using a sufficient number of power management devices 16, or a sufficient amount of an entirety of the load coupled with the electrical power distribution system 10 is controlled via devices 16. For example, it is believed that control of approximately 3% of the load or more of a system 10 may provide perceptible changes in system operation.

Exemplary power management devices 16 described herein are configured to monitor system frequency of electrical energy of the power distribution system 10 and to implement power management operations responsive to the monitoring. If provided in sufficient quantity, the power management devices 16 of system 15 can be used to control an electrical characteristic of the electrical energy. In the described example, power management devices 16 automatically implement load shedding operations responsive to the system frequency sufficiently deviating from a desired nominal frequency. If used in sufficient quantity, the aggregate effect of load-shedding operations of the devices 16 may automatically cause the system frequency to return within an acceptable range of deviation of the nominal system frequency. As mentioned previously, deviation of system frequency from the nominal system frequency represents disparities between electrical energy generation and consumption. If electrical energy consumption outweighs production, the system frequency drops relative to the desired nominal frequency. Accordingly, automatically shedding load using devices 16 responsive to system frequency monitoring operations reduces the disparity of consumption to generation at a given moment in time, and the system frequency begins to return to an acceptable range without alteration of operations at the supply 12.

As mentioned above, the power management devices 16 are configured according to a plurality of defined rules to implement load shedding and restoration operations in the illustrated examples. The described embodiments provide rules which control shedding and restoration of loads responsive to monitoring of the electrical energy of the power distribution system 10. As described above, the exemplary rules of the devices 16 reduce or cease application of electrical energy to respective loads 18 responsive to an electrical characteristic of the electrical energy triggering respective threshold values of the devices 16.

If a sufficient number of devices 16 configured according to the exemplary rules described herein are utilized, emergent behavior of the system 15 results wherein the devices 16 conforming to well-defined common rules change the aggregate group behavior of the devices 16 acting together (e.g., change the behavior of the system 10 corresponding to a change in the electrical characteristic of the electrical energy within the system 10) and individual devices 16 are autonomous and oblivious to goals of the system 15 in one arrangement.

Provision of the upper bounding value and the lower bounding value define a desired operating range of the power distribution system 10 for the respective electrical characteristic being monitored. Operation of a sufficient number of the power management devices 16 of system 15 configured with the upper and lower bounding values may maintain operations of the electrical power distribution system 10 within the desired operating range.

If a sufficient number of devices 16 are utilized in a system 10, it is possible according to additional aspects to determine or approximate the magnitude of a deficit of electrical energy production (also referred to as unserved load) at moments in time using system frequency information. For example, if devices 16 are associated with loads 18 having known amounts of power consumption (and it is also known at what approximate values of the system frequency wherein load shed operations are implemented by devices 16), then it is possible to approximate an amount of electrical energy deficit at moments in time corresponding to the system frequency. In other words, if the system frequency is at a given value wherein it is known that a number of devices 16 and associated loads 18 are in the shed mode state of operation due to the respective range of trigger thresholds (the number of loads in shed mode are determined by the system frequency and the respective trigger thresholds, and the amount of associated electrical energy consumed or shed by the loads is known), then it is possible to calculate the amount of electrical energy deficient with respect to the system 10. In addition, using the current price for the electrical energy at the moment in time, as well as a supply and demand curve, it is possible to approximate or estimate the price of the electrical energy if the amount of the deficit is supplied by increasing the output of supply 12. Accordingly, system frequency may be utilized to determine or approximate an amount of unserved load at moments in time and approximate price information if the unserved load were to be served by increasing the electrical energy output of supply 12.

As described above, exemplary aspects of the power management system 15 described herein provide power management devices 16 which change respective thresholds to create an equitable distribution of inconvenience (e.g., load shedding) to the users. Further, utilization of a sufficient number of devices 16 configured according to exemplary rules described herein results in emergent behavior.

According to additional aspects, power management system 15 comprising devices 16 may be utilized to avoid or minimize power flow oscillations within electrical power distribution system 10. More specifically, operational problems may sometime arise when the conditions of supply and demand dictate power transfers over an inadequate transmission corridor of system 10. In such an exemplary situation, unstable transfers of electrical power from one or more generating unit in a geographic region of system 10 to another set of generators in a separate geographic region may occur. These unstable transfers of power manifest themselves in the form of oscillations. The phenomenon is often called dynamic instability or small-signal instability. This form of instability can cause system operators to limit the capacity of a transmission system thereby increasing the cost of delivered power. In severe cases, the instability can cause widespread blackouts.

Power oscillations may be detected by monitoring power flows through a transmission corridor or by monitoring system frequency. When one observes a time series plot of system frequency, for example, small oscillations are often visible even to an untrained observer. As these oscillations grow in magnitude, they may become more serious threats to stable power system operation.

According to additional aspects, power management devices 16 may be configured to detect power oscillations and to minimize or eliminate the power oscillations before problems occur.

Referring to FIG. 5, an exemplary methodology executable by control circuitry 24 is shown according to one embodiment to detect power oscillations and implement corrective action responsive to the detection. Other methods are possible including more, less or alternative steps.

At a step S40, the control circuitry obtains the system frequency at a plurality of moments in time. One exemplary method of determining system frequency has been described previously. Monitoring system frequency may be used to detect power oscillations, having a respective oscillation frequency, and corresponding to flows of power intermediate different geographic portions of system 10. The control circuitry may detect the oscillation frequency (e.g., typically 1-3 Hz) by detecting oscillations in the system frequency (e.g., the system frequency oscillating between 59 and 61 Hz at exemplary oscillation frequencies of 1-3 Hz).

At a step S42, the control circuitry decimates the system frequency data to a sample rate amendable to Fourier analysis in the described example. For example, data may be provided at a sampling rate of approximately 100 Hz and decimated to 20 Hz. Decimation increases resolution of the received data around the range of interest wherein power oscillations are expected to occur (e.g., 0-5 Hz).

At a step S44, the control circuitry low pass filters the data to remove extraneous data including noise associated with system operation and/or sampling. For 1-3 Hz data of interest in the described example, the control circuitry implementing the low pass filtering may have a −3 dB point of 5 Hz. Information of other ranges may be processed in other embodiments. The output from the low pass filtering includes oscillatory frequency components.

At a step S46, the control circuitry implements Fourier processing to yield information regarding the magnitude of the power oscillations at frequencies of interest. Exemplary Fourier processing includes Fast Fourier Transform (as shown in the illustrated example), Discrete Fourier Transform, and Continuous Fourier Transform. Other types of processing are possible.

At a step S48, the control circuitry determines whether the magnitude of the power oscillations exceeds an oscillation threshold. In one example, an oscillation threshold corresponding to 1% damping may be used. Percent damping may be a measure of the magnitude of the oscillation as commonly used in the trade.

If the condition of step S48 is negative, the control circuitry may return to step S40 to continue power oscillation monitoring.

If the condition of step S48 is affirmative, the control circuitry may proceed to a step S50 to take appropriate corrective action. As indicated, exemplary corrective action may include adjusting an electrical demand of the associated load via load shedding operations and/or load modulation operations.

More specifically, the control circuitry 24 is configured in one aspect to implement the corrective action in an attempt to reduce the magnitude of the power oscillations which may grow responsive to the dynamic configurations of electrical power distribution system 10 (e.g., power oscillations matching a resonant frequency of a configuration of the electrical power distribution system 10 at a particular moment in time).

One exemplary corrective action includes shedding load as described previously. For example, the amount of power consumed by the respective load 18 coupled with the device 16 may be reduced or ceased all together. The magnitude of the power oscillations may be reduced to an acceptable level as a result of the load shedding removing the resonant condition of the system 10. In particular, the resonant frequency of the system 10 may be altered or changed a sufficient degree if a requisite amount of load is shed by one or more device 16 responsive to the monitoring of the power oscillations. Further, by simply reducing demand, the system 10 is less stressed and an occurring power oscillation may become stable without further measures. Alternately, the reduction in demand may "buy time" for human intervention by system operators to correct any underlying problems. Typically, a human operator may reconfigure the system 10 to mitigate power oscillations following the adjustment operations described herein. Following stabilization, loads 18 may be manually or automatically returned to operation, for example, using a timer.

In another exemplary arrangement, the amount of electrical energy applied to a load 18 by a respective device 16 may be modulated according to power oscillations in an effort to dampen the oscillations and to reduce the magnitude of the oscillations to an acceptable level. For example, the control circuitry 24 may determine the direction of the power flow by monitoring whether the system frequency is increasing or decreasing. Thereafter, the control system 24 may synchronize the modulation of the load 18 with the oscillation frequency. For example, if a power flow oscillation is swinging from a first geographic portion of the system 10 to a second geographic location of the system 10, the devices 16 in the first geographic location could be changed from a load restore mode of operation to a load shed mode of operation and devices 16 in the second geographic location could be changed from a load shed mode of operation to a load restore mode of operation in an effort to dampen the power oscillations. Other embodiments are possible for monitoring and/or reducing power oscillations within system 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrical power distribution control method comprising:
applying electrical energy from an electrical power distribution system to a load;
varying a single threshold to comprise a plurality of different values at a plurality of respective moments in time, and wherein the single threshold corresponds to an electrical characteristic of the electrical energy; and
adjusting an amount of the electrical energy applied to the load as a result of the electrical characteristic of the electrical energy triggering one of the values of the single threshold at one of the moments in time when the single threshold comprises the one of the values.

2. The method of claim 1 further comprising monitoring the electrical characteristic of the electrical energy, and wherein the adjusting comprises adjusting as a result of the monitoring.

3. The method of claim 2 wherein the monitoring comprises monitoring frequency of the electrical energy.

4. The method of claim 3 wherein the adjusting comprises adjusting as a result of the frequency of the electrical energy dropping below the one of the values of the threshold.

5. The method of claim 2 wherein the applying comprises applying the electrical energy to the load located at a customer location, and the monitoring comprises monitoring using control circuitry located proximate to the customer location.

6. The method of claim 1 wherein the applying comprises applying the electrical energy to the load located at a customer location, and the adjusting comprises adjusting using control circuitry located proximate to the customer location.

7. The method of claim 6 wherein the control circuitry comprises control circuitry of a power management device coupled with the load.

8. The method of claim 6 wherein the control circuitry comprises control circuitry of the load.

9. The method of claim 1 wherein the providing the different values comprises randomly assigning the values.

10. The method of claim 1 wherein the providing comprises providing the different values according to a statistical distribution.

11. The method of claim 1 wherein the adjusting comprises reducing the amount of the electrical energy, and further comprising:
monitoring a length of time of the adjustment; and
increasing an amount of the electrical energy to the load as a result of the length of time exceeding a time out.

12. The method of claim 1 wherein the adjusting comprises adjusting for a variable length of time.

13. The method of claim 1 wherein the adjusting comprises adjusting for a random length of time.

14. The method of claim 1 wherein the adjusting comprises reducing the amount of electrical energy applied to the load.

15. The method of claim 1 wherein the adjusting comprises ceasing the applying of the electrical energy.

16. The method of claim 1 wherein the applying comprises applying the electrical energy received from a grid of the electrical power distribution system and the adjusting comprises adjusting as a result of the electrical characteristic of the electrical energy of the grid triggering the one of the values of the threshold.

17. The method of claim 1 wherein the applying comprises applying the electrical energy received from a transmission network of a grid of the electrical power distribution system and the adjusting comprises adjusting as a result of the electrical characteristic of the electrical energy of the transmission network triggering the one of the values of the threshold.

18. The method of claim 1 wherein the adjusting comprises increasing the amount of the electrical energy applied to the load.

19. The method of claim 1 wherein the adjusting comprises initiating the applying of the electrical energy to the load.

20. The method of claim 1 wherein the electrical characteristic is indicative of an electrical characteristic of the electrical energy upon a grid of the electrical power distribution system.

21. The method of claim 1 wherein the adjusting comprises adjusting as a result of the electrical characteristic of the electrical energy upon a grid of the electrical power distribution system triggering the one of the values of the threshold.

22. The method of claim 2 wherein the monitoring comprises monitoring the electrical characteristic which is indicative of an electrical characteristic of the electrical energy upon a grid of the electrical power distribution system.

23. The method of claim 1 wherein the adjusting comprises adjusting as a result of the electrical characteristic of the electrical energy triggering the one of the values of the threshold comprising falling below the one of the values of the threshold at the one of the moments in time.

24. An electrical power distribution control method comprising:
applying electrical energy from an electrical power distribution system to a load;
providing a plurality of different values for a threshold at a plurality of moments in time and corresponding to an electrical characteristic of the electrical energy;
adjusting an amount of the electrical energy applied to the load as a result of an electrical characteristic of the electrical energy triggering one of the values of the threshold at the respective moment in time; and
wherein the providing the different values comprises randomly assigning the values.

25. An electrical energy demand monitoring method comprising:
applying electrical energy from an electrical power distribution system to a plurality of loads coupled with the electrical power distribution system;
monitoring an electrical characteristic of the electrical energy;
adjusting an amount of electrical energy which is consumed by at least one of the loads as a result of the monitoring; and
calculating a deficit of the electrical energy of the electrical power distribution system using the monitoring.

26. The method of claim 25 wherein the monitoring comprises monitoring frequency of the electrical energy.

27. The method of claim 25 wherein the adjusting comprises reducing the amount of electrical energy which is consumed by the at least one of the loads.

28. The method of claim 25 wherein the adjusting comprises ceasing the consumption of the electrical energy by the at least one of the loads.

29. The method of claim 25 wherein the calculating comprises:
determining a number of the loads whose consumption of electrical energy has been adjusted using the monitoring; and
quantifying an amount of electrical energy consumed by the number of the loads.

30. The method of claim 29 wherein the determining comprises statistically determining.

31. The method of claim 29 further comprising associating a plurality of threshold values with respective ones of the loads, and wherein the adjusting comprises adjusting as a result of the electrical characteristic triggering a respective one of the threshold values, and wherein the determining comprises determining using the threshold values.

32. The method of claim 25 further comprising estimating a price of electrical energy using the calculated deficit.

33. The method of claim 25 wherein the applying comprises applying the electrical energy received from a grid of the electrical power distribution system.

34. The method of claim 33 wherein the monitoring comprises monitoring the electrical characteristic of the electrical energy of the grid.

35. The method of claim 34 wherein the deficit is indicative of a relationship of generation and consumption of the electrical energy on the grid of the electrical power distribution system.

36. The method of claim 33 wherein the calculating comprises calculating the deficit of the electrical energy on the grid of the electrical power distribution system.

37. The method of claim 25 wherein the applying comprises applying the electrical energy received from a transmission network of a grid of the electrical power distribution system.

38. The method of claim 37 wherein the monitoring comprises monitoring the electrical characteristic of the electrical energy of the transmission network.

39. The method of claim 38 wherein the deficit is indicative of a relationship of generation and consumption of the electrical energy on the transmission network of the electrical power distribution system.

40. The method of claim 37 wherein the calculating comprises calculating the deficit of the electrical energy on the transmission network of the electrical power distribution system.

41. An electrical energy demand monitoring method comprising:
    applying electrical energy from an electrical power distribution system to a plurality of loads coupled with the electrical power distribution system;
    monitoring an electrical characteristic of the electrical energy;
    adjusting an amount of the electrical energy applied to at least one of the loads as a result of the monitoring;
    calculating a deficit of the electrical energy of the electrical power distribution system using the monitoring;
    wherein the calculating comprises:
        determining a number of the loads having the application of electrical energy adjusted using the monitoring; and
        quantifying an amount of electrical energy consumed by the number of the loads;
    associating a plurality of threshold values with respective ones of the loads;
    wherein the adjusting comprises adjusting as a result of the electrical characteristic triggering respective ones of the threshold values; and
    wherein the determining comprises determining using the threshold values.

42. An electrical power distribution control method comprising:
    applying electrical energy from an electrical power distribution system to a load using a power management device;
    detecting a power oscillation within the electrical power distribution system; and
    adjusting an amount of electrical energy applied to the load using the power management device as a result of the detecting; and
    wherein the detecting comprises monitoring system frequency of the electrical energy and the monitoring comprises:
        decimating data of the system frequency of the electrical energy;
        low pass filtering the data;
        Fourier processing the data; and
        comparing the processed data to an oscillation threshold.

43. The method of claim 42 wherein the adjusting comprises reducing the amount of the electrical energy applied to the load.

44. The method of claim 42 wherein the adjusting comprises ceasing the application of the electrical energy.

45. The method of claim 42 wherein the adjusting comprises:
    modulating the amount of electrical energy applied to the load using the power management device; and
    synchronizing the modulation with the power oscillation.

46. The method of claim 42 wherein the detecting comprises detecting an amplitude of the power oscillation reaching an oscillation threshold, and the adjusting comprises adjusting to reduce the amplitude of the power oscillation.

47. The method of claim 42 further comprising:
    further detecting an electrical characteristic of the electrical energy triggering a shed threshold; and
    adjusting an amount of electrical energy applied to the load as a result of the further detecting.

48. The method of claim 42 wherein the detecting comprises detecting the power oscillation on a grid of the electrical power distribution system.

49. The method of claim 42 wherein the detecting comprises detecting the power oscillation on a transmission network of a grid of the electrical power distribution system.

50. The method of claim 49 wherein the adjusting comprises adjusting to reduce an amplitude of the power oscillation.

51. The method of claim 42 wherein the detecting comprises detecting using the power management device.

52. The method of claim 42 wherein the detecting comprises detecting using the power management device and only using the electrical energy received by the power management device.

53. The method of claim 42 wherein the adjusting comprises adjusting to provide a reduced non-zero amount of electrical energy to the load compared with the amount of electrical energy applied to the load before the detecting.

54. A power management device comprising:
    an interface configured to receive electrical energy from an electrical power distribution system; and
    control circuitry configured to control an amount of the electrical energy provided to a load coupled with the power management device, to vary a single threshold to comprise a plurality of different values at a plurality of moments in time and corresponding to an electrical characteristic of the electrical energy, to monitor the electrical characteristic of the electrical energy with respect to the threshold, and to adjust the amount of the electrical energy provided to the load as a result of the electrical characteristic of the electrical energy triggering one of the values of the single threshold at one of the moments in time when the single threshold comprises the one of the values.

55. The device of claim 54 wherein the control circuitry is configured to access the different values comprising values generated in accordance with a statistical distribution.

56. The device of claim 54 wherein the control circuitry is configured to adjust the amount of the electrical energy for a variable length of time.

57. The device of claim 54 wherein the control circuitry of the power management device is proximately located with respect to the load.

58. The device of claim 54 wherein the control circuitry of the power management device is located within the load.

59. The device of claim 54 wherein the interface is located intermediate the electrical power distribution system and the load.

60. The device of claim 54 wherein the control circuitry of the power management device comprises control circuitry of the load.

61. The device of claim 54 wherein the control circuitry is configured to adjust the amount of the electrical energy comprising reducing the amount.

62. The device of claim 54 wherein the control circuitry is configured to adjust the amount of the electrical energy comprising ceasing the provision of the electrical energy to the load.

63. The device of claim 54 wherein the interface is configured to receive the electrical energy from a grid of the electrical power distribution system, and the control circuitry is configured to adjust the amount of the electrical energy as a result of the electrical characteristic of the electrical energy of the grid triggering the one of the values of the threshold.

64. The device of claim 54 wherein the interface is configured to receive the electrical energy from a transmission network of a grid of the electrical power distribution system, and the control circuitry is configured to adjust the amount of the electrical energy as a result of the electrical characteristic of the electrical energy of the transmission network triggering the one of the values of the threshold.

65. The device of claim 54 wherein the control circuitry is configured to monitor the electrical characteristic which is indicative of an electrical characteristic of the electrical energy upon a grid of the electrical power distribution system.

66. The device of claim 54 wherein the control circuitry is configured to adjust the amount of the electrical energy provided to the load as a result of the electrical characteristic of the electrical energy upon a grid of the electrical power distribution system triggering the one of the values of the threshold.

67. The device of claim 54 wherein the control circuitry is configured to adjust the amount of the electrical energy provided to the load as a result of the electrical characteristic of the electrical energy triggering the one of the values of the threshold comprising falling below the one of the values of the threshold.

* * * * *